(12) United States Patent
Gilbert

(10) Patent No.: X9228
(45) Date of Patent: Nov. 7, 1835

(54) CHARCOAL BURNER, CONICAL ARCH

(76) Inventor: Ezra B. Gilbert

United States Patent Patent No.: X9228

Ezra B. Gilbert, Euphrata Montgomery New York

Letters Patent

The schedule referred to in these Letters Patent and making part of the same containing a description in the words of the words of the said Ezra B. Gilbert himself of his improvement in the Conical arch Charcoal Burner.

Be it known that I Ezra B Gilbert of the town of Euphrata in the County of Montgomery & State of New York have invented a new and useful improvement in the mode of manufacturing Charcoal called "Gilberts Conical arch Charcoal Burner" which is described as follows, reference being had to the annexed drawings of the same making part of this Specification.

This Conical arch Charcoal Burner a is built of brick or stones and a convenient size, will be about sixteen feet diameter at the base and twelve feet high although it, as well as its parts may be varied in size to suit circumstances.

The brick or stone (the former being preferable) is to be laid in lime, mortar or cement commencing at the base by a circular wall from six to nine inches in thickness. leaving apertures or vents b. four inches square about twenty inches apart all around the wall except certain spaces to be left for doors. These spaces for the doors C are to be from three to four feet in width and from five to six feet in height. The doors may be narrower at the top than at the bottom. At two inches above the apertures or vents first mentioned commences another row of apertures or vents d. four inches by two and dividing the spaces of the first row. Here the wall is to be raised about two feet four inches contracting the diameter of the circle at the same time about two feet. Here leave another row of vents e. also about twenty inches apart of four inches by two. Then raise the wall three feet more contracting the diameter of the circle four feet, at which point add another row of vents f. of the size of those last mentioned and from twenty to twenty four inches apart. Then carry up said wall contracting it in size so as to make the circle one foot in diameter at the height of twelve feet and scattering around the wall over the space last mentioned three or four vents g. of the size of those last mentioned. When the conical arch Charcoal burner is thus Constructed, fill it with wood Commencing at the bottom with sticks of small size to be placed in layers six inches from the ground and laid up at at least one foot high crosswise in a loose manner; then lay in wood in a horizontal manner as compactedly as possible to the top of the burner. After the wood is thus put in close the doors; For convenience each door should be made in three pieces or parts of brick and Morter and kept together by hoops of iron Fire must be communicated to the wood through the opening at the top and as soon as the fire burns freely Close this opening with bricks to be kept together as the pieces of the doors are; as soon as the fire approaches the upper vents which will be discoverable by the bluish Colour of the smoke they are to be closed with brick and Morter so as to prevent air or smoke from passing through them; and the fire descends the other vents are to be closed in like manner except the vents at the base which is to be kept open untill the fire is seen through them Then close the lower tier of vents as soon as the fire is seen through each one. When all are closed care should be taken that neither smoke nor air escapes from any part of the structure.

The Coal burner is to be kept thus closed from four to five days when the fire will become smothered or extinguished at which time the doors can be taken down and the coal taken out fit for use.

The whole process of burning and cooling the Coal taking about seven or eight days. What I claim as my invention and never before known and which I desire to secure by Letters Patent is the before described conical arch Charcoal burner for manufacturing Charcoal Witness
Wm P Elliot
B Bliss Ezra B. Gilbert Rcd
W.H.

(Drawing)

[ 780 [illegible]